United States Patent [19]

Rosen

[11] Patent Number: 5,706,130
[45] Date of Patent: Jan. 6, 1998

[54] SUPPORT ASSEMBLY FOR A RETRACTABLE DEVICE

[76] Inventor: John B. Rosen, 87580 Cherry Ridge Rd., Eugene, Oreg. 97402

[21] Appl. No.: 550,197

[22] Filed: Oct. 30, 1995

[51] Int. Cl.$^6$ .................................................. G03B 21/56
[52] U.S. Cl. .................... 359/443; 359/461; 16/221; 16/284; 16/319
[58] Field of Search ........................ 359/443, 461; 16/221-223, 284-291, 319-327

[56] References Cited

U.S. PATENT DOCUMENTS

| | | | |
|---|---|---|---|
| 4,068,921 | 1/1978 | Okumura | 350/117 |
| 4,595,140 | 6/1986 | Harden et al. | 239/167 |
| 4,705,355 | 11/1987 | Espo | 350/117 |
| 5,084,939 | 2/1992 | Garman | 16/84 |
| 5,337,976 | 8/1994 | Derrien | 244/102 |
| 5,375,294 | 12/1994 | Garrett | 16/34 |

Primary Examiner—Safet Metjahic
Assistant Examiner—D. P. Malley
Attorney, Agent, or Firm—Kolisch, Hartwell, Dickinson, McCormack & Heuser

[57] ABSTRACT

A support assembly for supporting a retractable device includes a frame, at least one arm movably mounted on the frame for carrying the device between a retracted position for stowing the device, and an extended position for presenting the device, and a reactionator couple operatively connected to the arm for resisting, in part, against the arm when it is moved from the extended position to the retracted position, thereby slowing the rate at which the device is retracted.

21 Claims, 7 Drawing Sheets

SUPPORT ASSEMBLY FOR A RETRACTABLE DEVICE

BACKGROUND AND SUMMARY OF THE INVENTION

This invention relates generally to a support assembly for a retractable device, and more particularly, it concerns a video screen retraction decelerator for reducing the speed at which a video screen is retracted.

Video screens of the type which may be unfurled or unrolled are well known. Such screens are usually portable or stationary. The portable types usually include a collapsible, light-weight frame for supporting the screen which may be unfurled and attached to a catch usually located at the bottom of the frame. The stationary types of screens are usually mounted on a fixed frame which, in turn, is mounted on a relatively permanent structure, such as the area adjacent a blackboard or a white board (in a classroom or meeting room).

Anyone who has attempted to refurl a presented screen after use will recall that, in those screens which are biased to refurl by themselves (as by some type of spring-loaded mechanism), such screens usually attempt to do so at a very rapid rate. That is, once the screen is released from its presented position, its natural tendency is to rapidly refurl or rewrap itself around its long axis. This is undesirable for many reasons, not the least of which is that it wears on the screen (in some cases resulting in tears) and unnecessarily wears on the furling mechanism.

Another reason that the tendency of a screen to rapidly refurl is undesirable is that if one were to inadvertently place a finger in the way of a refurling screen, an unnecessary injury might result. Furthermore, a rapidly refurling screen does not present a very pleasing or professional visual aid.

Thus, there is a need for a screen presentation device which enables a screen to be refurled or retracted in a manner which reduces wear and tear on the screen itself, and one which reduces the speed at which a screen is refurled or retracted. Such a device would greatly reduce the chances that an operator would be injured if a finger were to be placed in the screen's retraction path.

With the above problems in mind, it is a general object of the invention to provide a support assembly for a retractable device which reduces the rate at which such device may be retracted.

It is another object of the invention to provide a support assembly for a retractable video screen, which enables the screen to be raised and lowered at a rate which is safe, and which ensures the integrity of the screen and the assembly by reducing the wear and tear on both.

It is yet another object of the invention to provide a retractable, device-carrying support which saves space, and which permits a device carried thereon to be stowed in an out-of-the-way location.

It is a further object of the invention to provide a device-carrying support which is lightweight, durable, and easy-to-manufacture.

The invention achieves these and other objects in the form of a support assembly for supporting a retractable device which includes a frame, an arm movably mounted on the frame for carrying the device between a retracted position for stowing the device, and an extended position for presenting the device, and a reactionator couple operatively connected between the frame and the arm for resisting, in part, against the arm when it is moved from the extended position to the retracted position, thereby slowing the rate at which the device is retracted. In a preferred embodiment, the reactionator couple includes a shock absorber or pressure unit which is fixed on the arm and which includes a pressurized stopper, and a glide for confronting the stopper when the arm is moved between the extended and retracted position for slowing the rate at which the arm is retracted.

According to one feature of the invention, a retractable projection screen support is provided which includes a frame, a pair of inwardly-foldable, bi-directionally-movable opposed arms mounted on the frame for moving the support between a retracted position for stowing the screen, and an extended position for presenting the screen. At least one pressurized retraction decelerator is coupled between the frame and at least one of the opposed arms, for slowing the movement of the support when the same is moved from the extended position to the retracted position. Preferably, the arms are pivotally mounted on the frame for articulation between the retracted and extended positions, and each of the arms includes an associated pressurized retraction decelerator to slow the movement of the arms between the extended and retracted positions.

These and other advantages and features of the invention will become more fully apparent when the detailed description below is read with reference to the accompanying drawings.

DETAILED DESCRIPTION OF THE PREFERRED EMBODIMENT

As shown in FIGS. 1-4, a support assembly for supporting a retractable device, constructed according to the present invention is generally indicated at 10. Although the present invention is described in the context of its use in conjunction with a device in the form of a stowable, furlable screen such as one would find on an airplane or in a meeting room or classroom, it is to be understood that the present invention is employable in a vast number of environments and with other types of devices wherein it is desired to access the device (which need not necessarily be a screen) from a position where it may or may not be stored out of view. The present invention derives particular utility in that it conserves space. It should be apparent, however, that that particular feature of the invention should not be limiting insofar as the invention is useful in situations where space may not even be a concern. With that, the preferred embodiment will now be described.

Turning attention to FIGS. 1–4, support assembly 10 may be seen to include a frame 12 which includes an upper frame member 14 and a lower frame member 16. Upper frame member 12 may be, and preferably is, fixedly mounted to a structure which is generally stationary, such as the interior of an airliner's passenger compartment, or the ceiling of a meeting room or classroom. It will be understood, however, that the structure to which upper frame 12 is mounted, may be portable as would permit an individual to move, from one location to another, a screen carried thereon. Lower frame member 16 may be seen to be a generally horizontally-oriented, tray-like member which maintains its horizontal disposition during presentment and retraction of a screen carried thereby, a representative screen being shown generally at 18 in FIGS. 1 and 1A in broken-away fashion.

Preferably, screen 18 is one which may be furled and unfurled in a conventional, spring-loaded-like manner. Screen 18 is mounted in any suitable fashion on upper frame member 14 and includes a bottom end which is fixed on lower frame member 16 so that when the lower frame member 16 moves from the extended position shown in FIG. 1, to the retracted position shown in FIG. 4, the screen is moved along with it. It should be understood, however, that the present preferred embodiment is useful and may be easily adapted for use with a screen which is not of the furlable/unfurlable type, but rather is a monitor-type screen which may or may not be of a thin-type construction such as a known, plasma-type monitor.

Figure 4:
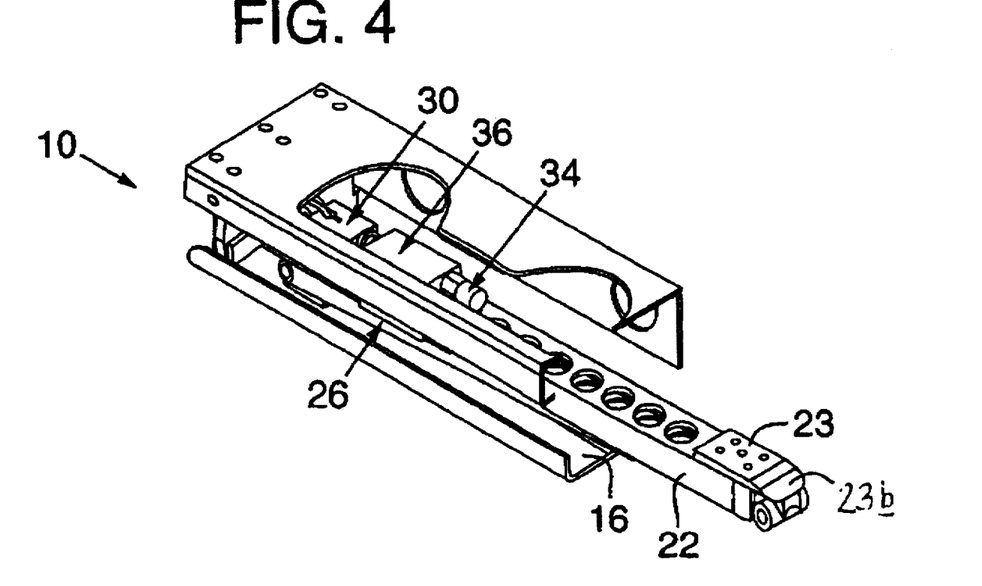
FIGS. 4 and 4A are views which are similar to FIGS. 3 and 3A, only showing the support assembly in the retracted position.
Figure 4A:
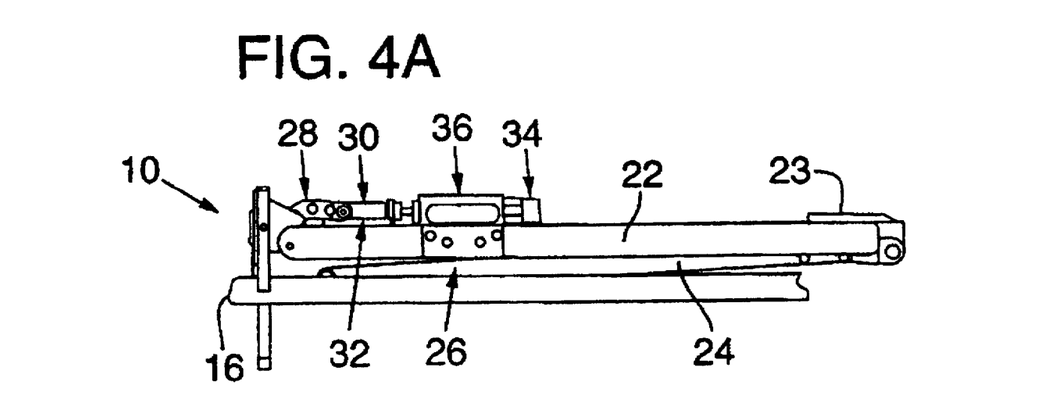

Returning now to a description of the preferred embodiment, the reader will see an arm 20 mounted on frame 12 for movably carrying screen 18 between the retracted and presented positions. In the preferred embodiment, arm 20 includes two pans, a top arm 22 (also referred to as an upper portion) and a bottom arm 24 (also referred to as a lower portion) pivotally connected thereto, and bi-directionally foldable inwardly for moving screen 18 between the extended position (FIG. 1) and the retracted position (FIG. 4). In addition to the arm just-described, assembly 10 preferably includes another arm, which is also designated 20 and shown in FIG. 1A with a central portion of the screen which lies between the arms removed to show that both arms are preferably mirror images of one another, and define a pair of opposed, articulable arms which are mounted for movement about defined parallel axes A, B which extend into the page as viewed in FIG. 1A. Pivot axis A is shown in more detail in FIGS. 6B and 6C, where only a portion of one of the arms is shown. Such a mounting scheme provides arms which are pivotable about an axis (respectively A or B), which is generally orthogonal to each arm's direction of movement or the plane through which each arm moves, which, it will be appreciated, is a great space-saving feature. It should be understood, however, that a second arm is not specifically required, and that various modifications may be made so that the present embodiment operates satisfactorily with only one arm, in the same space-saving articulable fashion.

Figure 1:
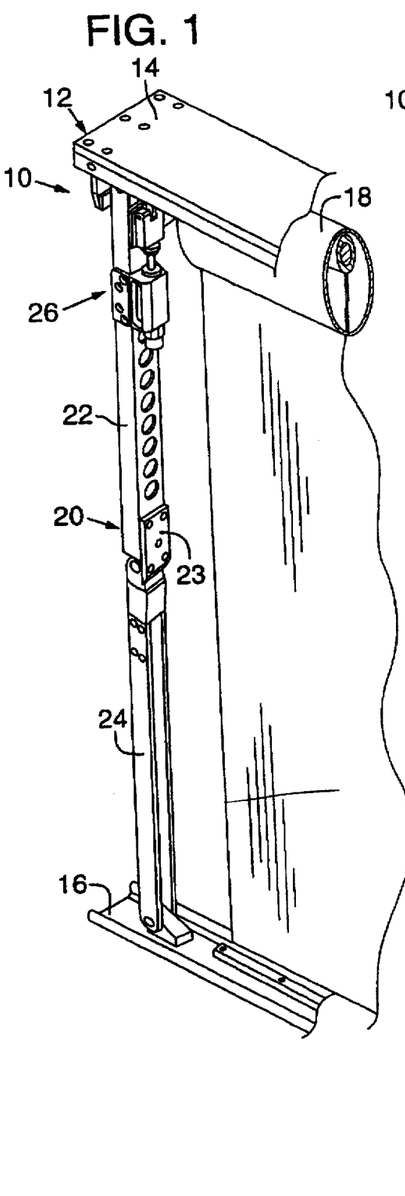
FIG. 1 is an isometric view of a portion of a support assembly, constructed according to the preferred embodiment, showing the assembly in an extended position.
Figure 1A:
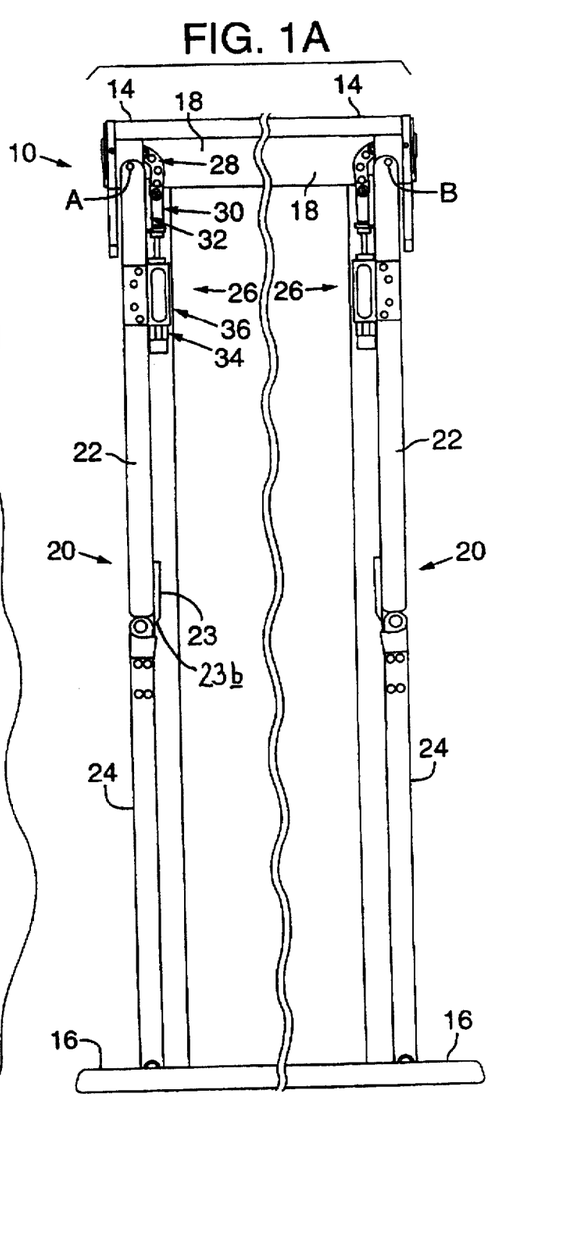
FIG. 1A is a front elevation of the preferred support assembly, showing two opposed arms mounted for articulation, with a middle region broken away.
Figure 2:
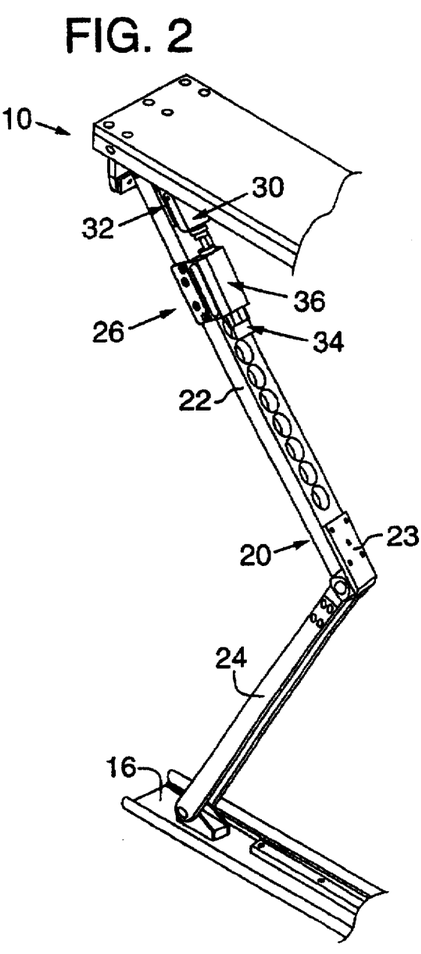
FIGS. 2 and 2A are views which are similar to the view shown in FIGS. 1 and 1A, only showing the support assembly in an intermediate position between the extended position and a retracted position.
Figure 2A:
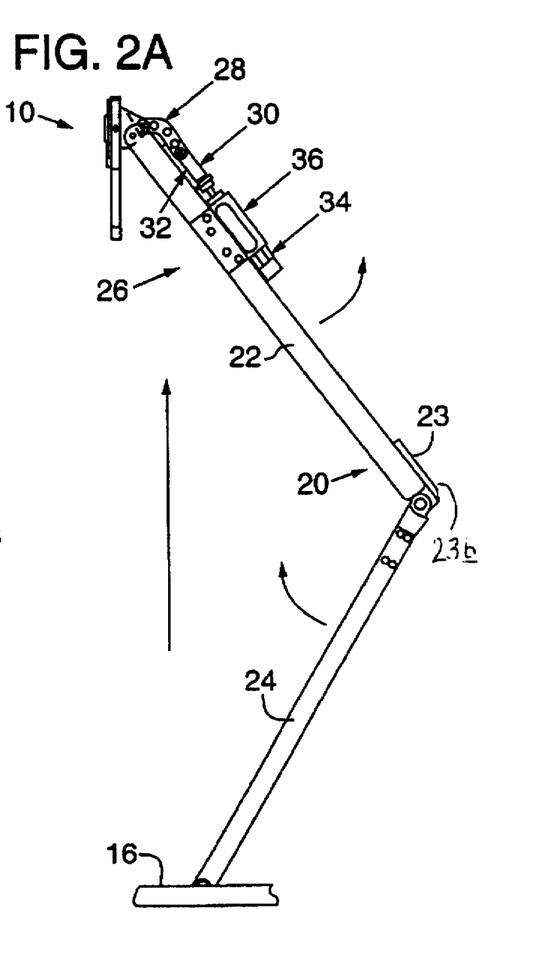
Figure 3:
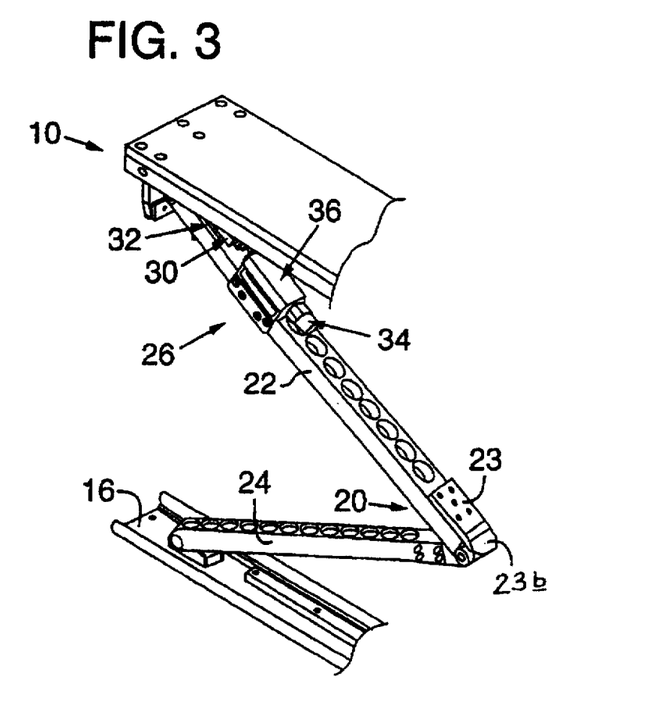
FIGS. 3 and 3A are views which are similar to the view shown in FIGS. 2 and 2A, only showing the support assembly in a next intermediate position, further toward the retracted position.
Figure 3A:
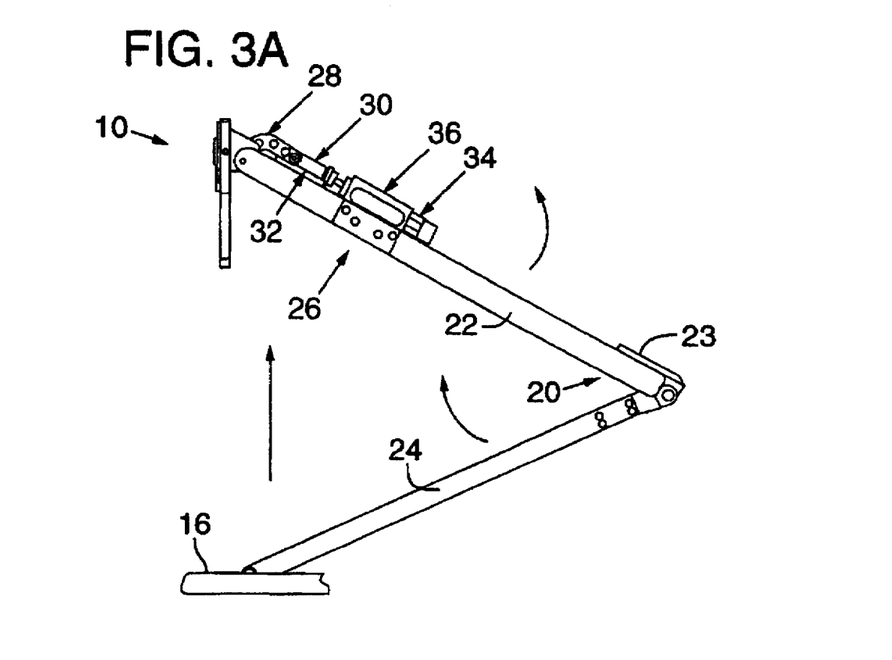

Shown generally at 26 in FIG. 1, and in greater detail in the serial progression of FIGS. 6A–6D, is a so-called reactionator couple which is operatively connected between frame 12 and arm 20, and more specifically, top arm 22, for resisting, in part, against arm 20 when the same is moved from the extended position (FIG. 1) to the retracted position (FIG. 4). Although couple 26 is preferably mounted between frame 12 and arm 20, it could be suitably mounted at any location on arm 20 or frame 16 so that it operates as described below.

The reactionator couple is thusly named for its ability to resist or oppose the force with which a device or screen is retracted or returned to the stowed position, thereby showing the rate of retraction. It is important, however, to recognize that some carried devices will not, by their very nature, possess inherent characteristics (such as the spring-loaded-type furlable screen) which cause them to exert a self-imposed retraction force. Such devices might include ones like the plasma monitor mentioned above. When devices such as these, e.g., passively-carried devices, are carried by the support assembly 10, the reactionator couple would resist or oppose the force exerted by an individual attempting to move the assembly from the extended position to the retracted position, thereby providing a cushioned return of the device to the retracted position. The reactionator couple, through the provision of its opposition force, whether such force opposes a carried device's inherent retraction force, or an individual's movement of the assembly, effectively reduces the rate at which a device or screen is retracted to the stowed position. This reduces the normal wear and tear ordinarily experienced by a device which may be presented and stowed hundreds or even thousands of times over its lifetime.

Figure 5A:
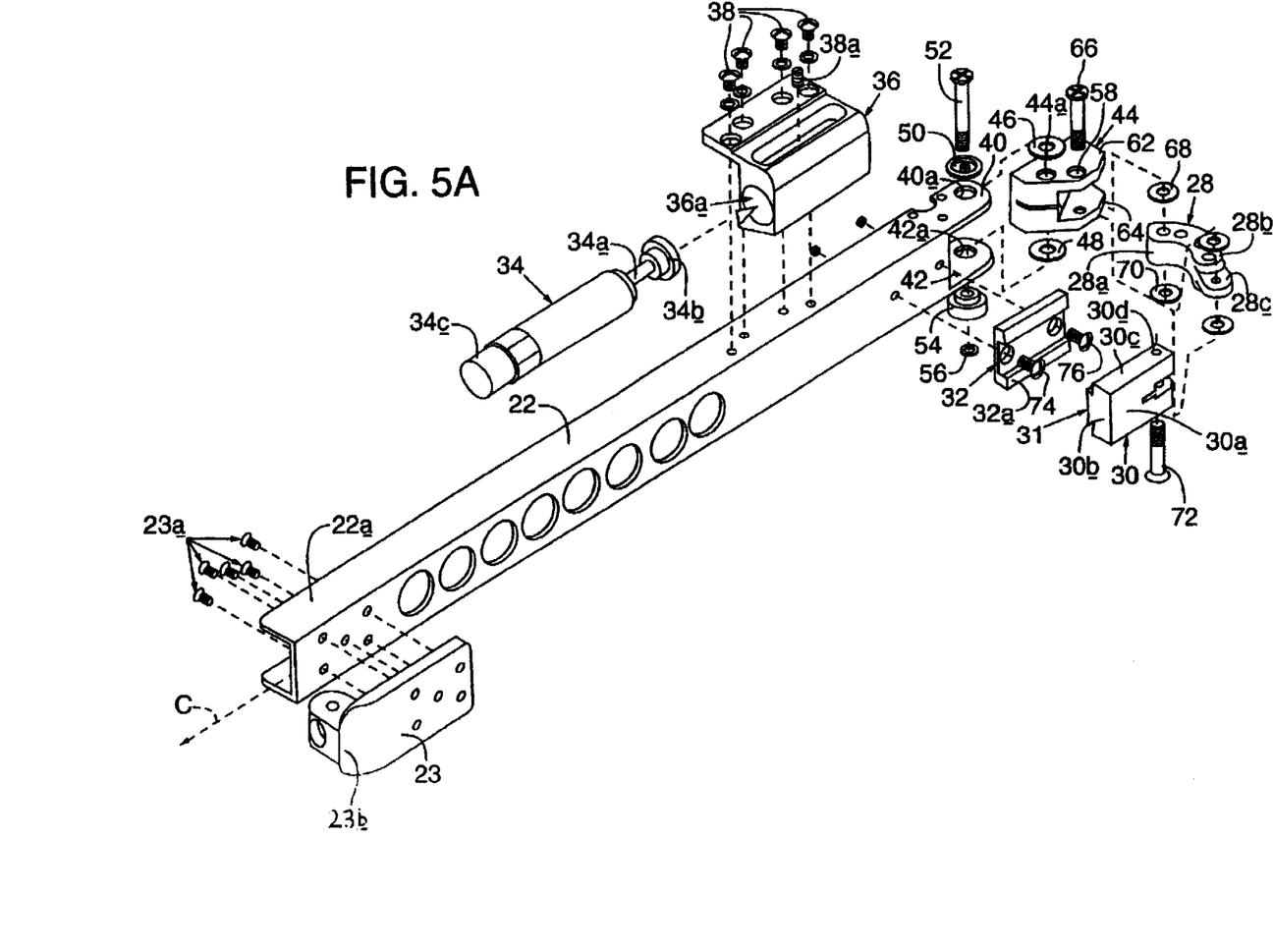
FIG. 5A is an isometric explosion of the top arm of the support assembly.
Figure 5B:
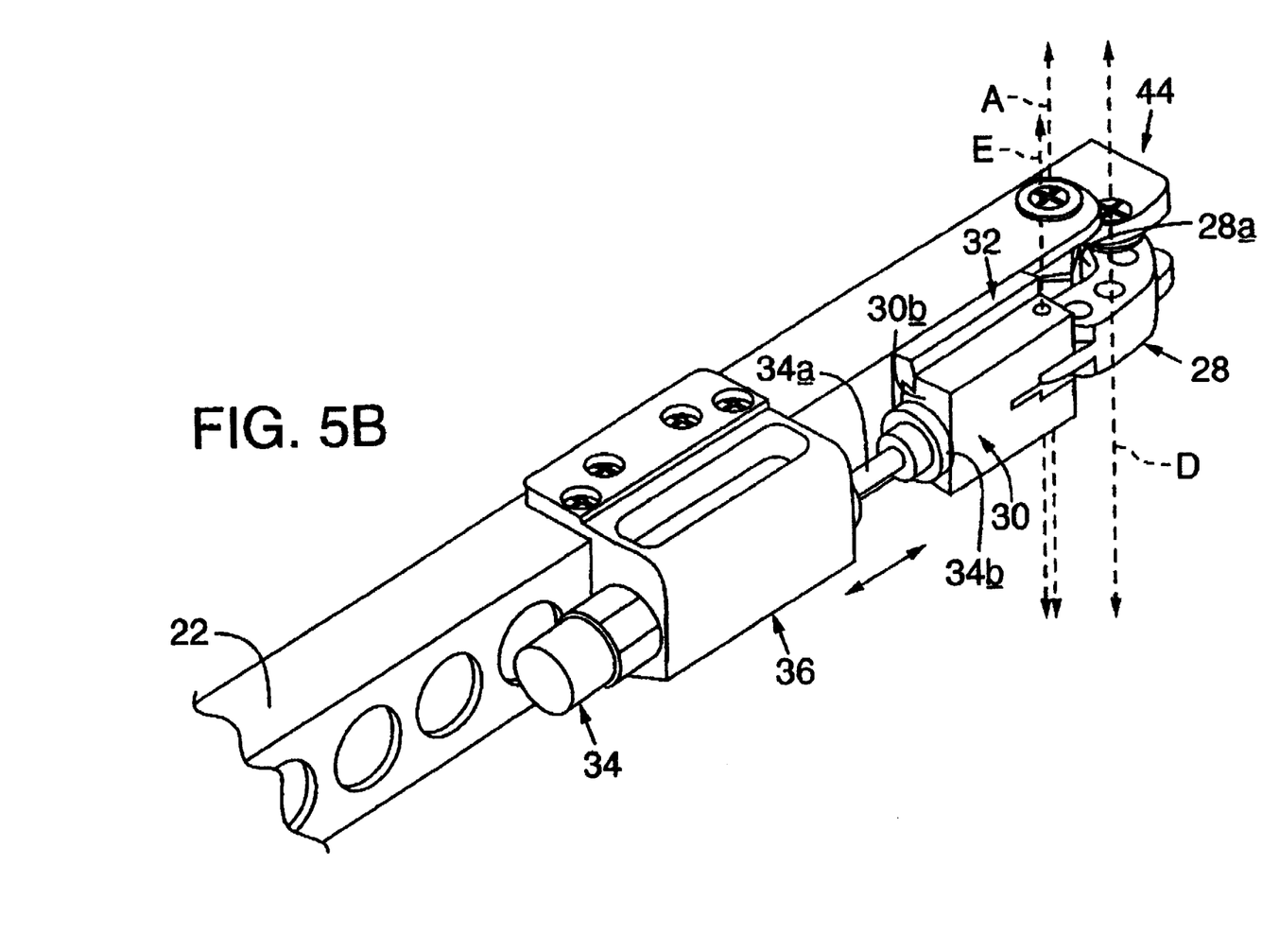
FIG. 5B is an isometric view of the top arm in a fully assembled state.

The preferred embodiment of the above-mentioned reactionator couple is best seen in FIGS. 5A–5B, where an exploded view is shown (FIG. 5A) and an assembled view is shown (FIG. 5B). Preliminarily, however, before a discussion of the reactionator couple, the reader's attention is directed to top arm 22 which may be seen to have a generally reverse-C-shaped cross-section taken along a line transverse the arm's long axis C, which enables the top and bottom arms 22, 24 respectively, to be stowed in a nested-like fashion, as is shown best in FIGS. 4 and 4A. This is an added space-saving feature. Top arm 22, preferably formed from a lightweight durable metal such as aluminum, includes a bottom end 22a to which a suitable top arm hinge 23 is fixedly attached by a plurality of screws indicated at 23a. Top arm hinge 23 provides a pivotable mount for bottom arm 24 (also formed from a suitable lightweight metal) which, as shown in FIGS. 1–4, is retractable by top arm 22 from the extended position to the retracted position, and which enables the hi-directional foldability discussed above. Hinge 23 also prevents the arms 22, 24 from being hyper-extended by providing an extension 23b(FIGS. 1A and 5A) which depends downwardly and engages bottom arm 24 when the arms are placed in the extended position.

Mounted at, or adjacent the top end of top arm 22, reactionator couple 26 is operatively connected between frame 12 and the arm, for resisting, in part, against the arm when the same is moved from the extended position to the retracted position. The reactionator couple progressively slows the rate at which the retractable device is retracted. The preferred componentry for implementing the reactionator couple includes a pivot 28, a glide or slide member 30, a glide track 32, a shock absorber or pressure unit 34, and a shock retainer 36, all of which are described in greater detail below. Before, however, describing the separate preferred components of the reactionator couple, the structure on and adjacent arm 22 which is utilized to mount the reactionator couple to the arm will be described.

At the upper end of top arm 22 (the far right as viewed in FIG. 5A), two flat hinge members 40, 42 extend longitudinally away from arm 22 and include a pair of aligned apertures 40a, 42a, respectively. An arm pivot or saddle 44 includes a bore 44a extending therethrough for alignment with apertures 40it, 424 in respective hinge members 40, 42. A pair of conventional washers 46, 48 are respectively mounted adjacent the exposed ends of bore 44a, on either side of saddle 44, in a conventional manner. When saddle 44 is placed between the respective hinge members 40, 42, a countersink bushing 50 is placeable in aperture 40a and thereafter a screw 52 may be inserted therethrough, through bore 44a and fixedly attached on the other side of hinge member 42 by a counterbore bushing 54 and a lock nut 56. It will be appreciated that when saddle 44 is mounted as just-described, bore 44a defines the pivot axis A (FIG. 5B) discussed above and about which top arm 22 moves between the extended and retracted positions. The reader will notice that in addition to bore 44a, saddle 44 includes a pair of aligned apertures 58, 60 in what may be considered as the saddle's own respective hinge members 62, 64.

Turning now to a description of reactionator couple 26, a pivot or glide arm 28 includes a first end 28a, a second end 28b spaced from the first end, a flange 28c joined to the second end, and an arcuate region defining an elbow-like structure between first end 28a and flange 28c. Pivot 28 is mountable between the hinge members 62, 64 of saddle 44, adjacent apertures 58, 60, and pivotally held in place by a screw 66, washers 68, 70 and a lock nut which is not specifically shown. The pivotal mount adjacent first end 28a defines a pivot axis D which is specifically designated in FIG. 5B. Flange 28c adjacent second end 28b accommodates a pivotable mounting arrangement with glide 30 described just below.

Glide 30 is preferably generally rectangularly-shaped and includes plural sides, three of which are shown at 30a, 30b, and 30c. Side 30b is partially defined by a somewhat trapezoidal structure 31 which is joined thereto and extends longitudinally along the glide, along a side which is not shown, but will be understood to lie opposite of side 30a. Structure 31 defines what may be considered a key which is placeable in a complementary-formed slot described in more detail below. A pair of aligned apertures, only one of which is shown at 30d, extend through glide 30 transverse the glide's long axis and allow glide arm 28, and more specifically, flange 28c to be mounted for pivotal movement between two extensions on glide 30, which define what may be thought of as a hinge point defining a pivot axis E (FIG. 5B). A screw 72 is insertable through the glide's aligned apertures for capturing, pivotally, the glide arm's flange 28c.

A glide track 32 (just to the left of glide 30 in FIG. 5A), is generally flat, and includes a complementary-formed trapezoidal slot 32a for accommodating the trapezoidal structure 31 on glide 30 described above. It will be appreciated that the trapezoidal key/slot configuration could be of any suitable geometry which allows glide 30 to be captured for movement as described below. Glide track 32 is fixed or mounted, via plural screws 74, 76, on arm 22 adjacent its upper end, and allows glide 30 to move slidably, reciprocally therealong for a purpose which will become evident below. This is became trapezoidal slot 32a captures trapezoidal structure 31 on glide 30 (in a lock-and-key-type fashion) allowing the glide to be slidably, reciprocally advanced therealong. Having described pivot or glide arm 28, glide 30, and glide track 32 in some detail, and the operative connection therebetween, the reader will appreciate that the assemblage of these components might be described in the aggregate, as a glide member in which one end, 28a, is pivotally mounted on frame 12, and another end, 30b, which is spaced from end 28a, is associated with shock absorber 34 (which might also be referred to as a refraction decelerator) for a reason which, if not already apparent, will become so after the description below is read.

Turning attention to the upper left side of FIG. 5A, the reader will see indicated generally at 34, a so-called shock absorber or pressure unit, or, as it was referred to above, a retraction decelerator. A shock retainer 36 constructed for maintaining shock absorber 34 fixed on arm 22 is itself fixedly mounted on arm 22 via plural screw/washer pairs 38 in a manner permitting shock absorber 34 to be fixed relative to top arm 22. Shock retainer 36 includes an elongate cylindrical channel 36a which is generally parallel to the long axis C of top arm 22 for permitting the shock absorber to be mounted therein, in a fixed manner, for operatively engaging glide 30 described in more detail below. Preferably, channel 36a includes internal threads for screw-threadably engaging complementary threads on shock absorber 34, which are not specifically shown but will be understood to function to enable the shock absorber to be screwed into place. Shock absorber 34 may be any suitable shock absorber which includes a stopper arm 34a connected to a stopper 34b. Stopper arm 34a and hence stopper 34b are reciprocally movable, in a plunger-like fashion, within a pressurized cylinder internally of the shock absorber which is not specifically shown, but will be understood to provide a biasing force in a direction away from the shock absorber. Preferably, shock absorber 34 includes an adjustable knob 34c for enabling a user to vary the biasing force of the cylinder. Shock retainer 36 includes a set screw 38a which provides an added degree of safety by adjustably bearing against shock absorber 34 to hold it in place internally of shock retainer 36.

FIG. 5B shows reactionator couple 26 in its assembled state adjacent the upper end of arm 22. The reader will first notice that stopper 34b engages or abuts glide 30, and more specifically side 30b thereof, when couple 26 is assembled. The purpose of the engagement will become evident below when a description of the operation of the preferred embodiment is discussed.

Having described shock absorber 34 and glide 30 in some detail, it will become apparent that the assemblage defines a force-absorbing member or retraction-controlling element which resists against the upward movement of arm 22.

Operation

The above-described preferred embodiment provides an easy-to-use, safe-to-operate video screen retraction device which is quite useful for extending the lifetime of a screen which is carried thereby (whether the screen is a furlable/refurlable screen or a video monitor). This is due, in large part, to the reactionator couple(s) which acts to slow or decelerate the screen when the same is moved from the extended to the retracted positions. It will be appreciated, after the above description, that the reactionator couple's deceleration of the screen not only reduces wear and tear of the device itself, but it protects the screen carried thereby. In screens of the type which are furlable and refurlable, the present preferred embodiment prevents the screen from whipping itself into a retracted state. In screens of the type which include an electronic monitor (such as a thin plasma monitor), the present preferred embodiment protects the delicate electronic componentry housed internally of the monitor, and significantly reduces the chances that an overzealous individual would damage the same by forcibly returning it to the stowed position.

Figures 6A, 6B:
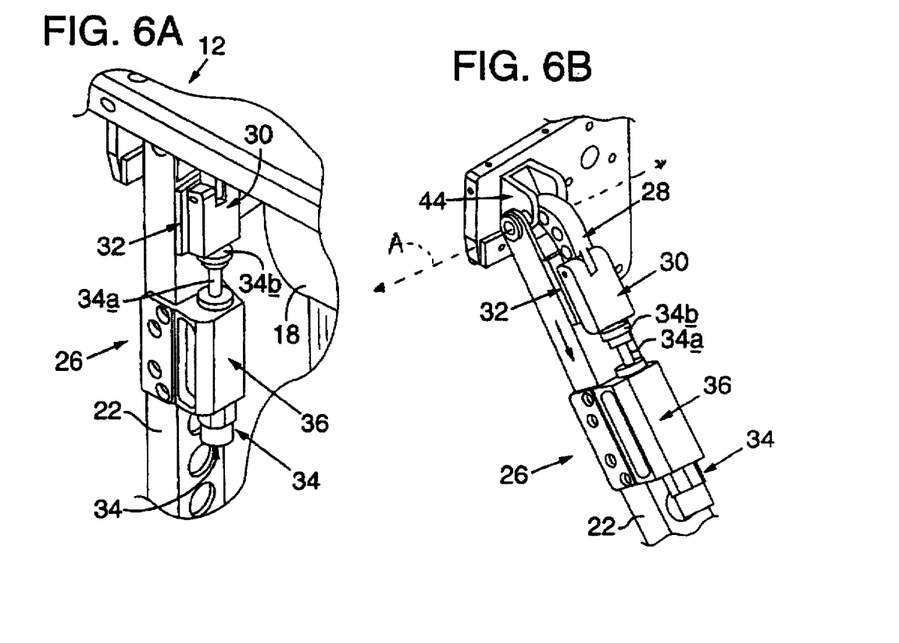
FIGS. 6A-6D show the upper region of the top arm of the support assembly in various positions from a fully extended position, two intermediate positions, and a retracted position.

FIGS. 1–4 show a somewhat serial progression of the support assembly at various positions between the extended position (FIG. 1) and the retracted position (FIG. 4), and FIGS. 6A–6B show correspondingly similar serial views of the reactionator couple at various positions between the extended and retracted positions. Before, however, returning the screen to its stowed position, it must first be accessed by a user. In order to access the screen, a user simply grasps a handle (not shown) on lower frame member 16 when the screen is in the retracted position (FIG. 4), and by pulling gently, downwardly, the screen may be exposed for use, and locked into position such as is shown in FIG. 1. As pointed out above, an extension 23b on hinge 23 prevents the arms from over-extending and maintains the arms in a substantially vertical orientation when the support assembly is placed in the extended position. A simple detent mechanism (not specifically shown) may be, and preferably is, provided adjacent the hinged connection between top arm 22 and bottom arm 24 so that the screen maintains its position when it is fully extended.

When it is desired to return the screen to its stowed or retracted position, an individual need simply exert a slight, upward force on the bottom frame member, which disengages the detent mechanism allowing the screen to return upwardly along a path toward the retracted or stowed position.

Figure 6C:
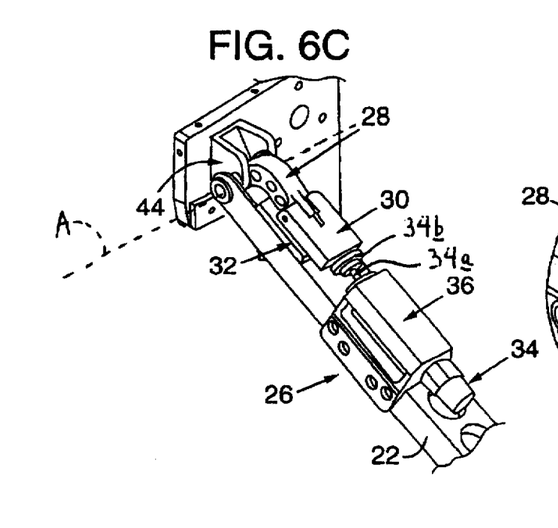
Figure 6D:
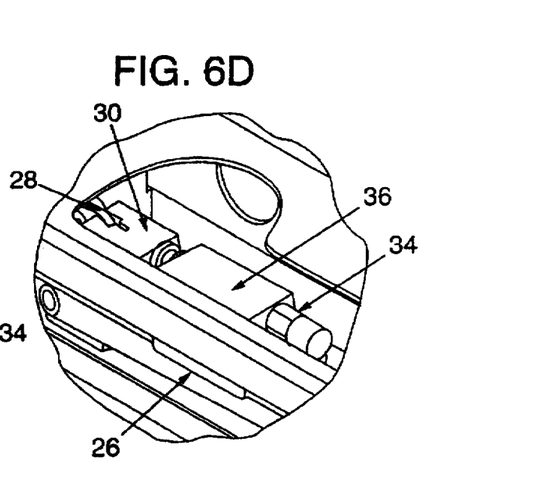

As the screen travels upwardly along its retraction path, glide arm 28 moves glide 30 and causes it to slidably advance along glide track 32 in a direction generally toward shock absorber 34. This is most apparent in FIGS. 6A–6C where, in the extended position (FIG. 6A), glide 30 and glide track 32 are essentially even with one another. FIGS. 6B and 6C show the next respective positions of the reactionator couple as the arm is moved toward the retracted position. The reader will observe that glide 30 slides further along on glide track 32 as the arm is raised closer to the retracted position. As a result of the arm's upward movement, side 30b, which is interposed between arm 28 and shock absorber 34, confronts stopper 34b and moves pressurized stopper arm 34a into the shock absorber's pressurized chamber, further and further, as the screen gets nearer and nearer to the top of its retraction path. It will be appreciated that through this abutting engagement, in which the shock absorber bears against the pivot or glide arm 28, the stopper arm 34a is advanced further into the shock absorber and the shock absorber's resistance to the arm's upward movement (due to the pressurization) is increased, thereby slowing the rate at which the screen is retracted until it reaches its retracted or nested position (FIG. 6D).

Briefly summarizing a support assembly for supporting a retractable device which includes a frame, an arm movably mounted on the frame for carrying the device between a retracted position for stowing the device, and an extended position for presenting the device, and a reactionator couple operatively connected between the frame and the arm for resisting, in part, against the arm when it is moved from the extended position to the retracted position has been described. The reactionator couple slows the rate at which a carried device is retracted to a stowed position. It does so, in the preferred embodiment, by providing a shock absorber or pressure unit which is fixed on the arm and which includes a pressurized stopper which is movable by a glide which is operatively connected to the frame, as the arm moves from the extended position to the retracted position. The glide is connected to a pivot, which, as the arm moves from the extended position to the retracted position, bears against the stopper driving it into the shock absorber, which effectively increases the resistance seen by the arm, as it moves toward the retracted position. It will be understood, however, that above-described preferred embodiment of the reactionator couple, and more generally, the support assembly itself, is a preferred embodiment and that modifications and variations are considered to be within the spirit and scope of the invention. As an example, and referring to the reactionator couple described above, there are number of resistance-developing or resistance-increasing devices which could be incorporated as a pressure unit or shock absorber. Such might include gas springs or other devices which use other types of media for developing a resistance between the arm and the frame. Further, such other devices (or even the preferred reactionator couple) might be relocated to a different position on the arm for developing the desired resistance at a different location. For example, a suitable reactionator couple might be mounted between the top and bottom arms adjacent the hinge point therebetween, or, for that matter, at any point on the arm where it may operate as described above. Moreover, it will be understood that while the present preferred embodiment has been described in conjunction with resisting against the arm when it is moved from the extended position to the retracted position, shock absorber 34 could be configured to resist against the arm when the same is moved from the retracted and the extended position. Such would be desirable for preventing a carried device from crashing down into the extended position.

While the present invention has been shown and described with reference to the foregoing preferred embodiment, it is to be understood by those of skill in the art that other changes in form and detail may be made therein without departing from the spirit and scope of the invention as defined in the appended claims.

I claim:

1. A support assembly for supporting a retractable device comprising:

a frame;

an arm pivotally mounted on the frame for carrying the device, the arm being movable between a retracted position for stowing the device, and an extended position for presenting the device; and a reactionator couple further connecting the frame and the arm for resisting movement of the arm substantially throughout movement of the arm from the extended position to the retracted position, thereby slowing the rate at which the device may be retracted.

2. The assembly of claim 1, wherein the arm is pivotable about an axis which is generally orthogonal to the arm's direction of movement.

3. The assembly of claim 2, wherein the reactionator couple includes a shock absorber mounted on the arm, the shock absorber having a pressurized stopper operatively pivotally connected to the frame.

4. The assembly of claim 3, wherein the reactionator couple further includes a movable glide pivotally connected to the frame and mounted on a glide track connected to the arm, the glide being engaged by the pressurized stopper to yieldably oppose movement of the glide along the glide track when the arm is moved between the extended and retracted positions.

5. The assembly of claim 4, wherein the device is a screen.

6. A support assembly for supporting a retractable screen comprising:

a frame;

a screen-carrying arm pivotally mounted on the frame for pivot about a first pivot axis between a retracted position for stowing the screen, and an extended position for presenting the screen; and a reactionator couple slidably mounted on the arm, the reactionator coupler including a force-absorbing member which interconnects the frame and the arm and is controllably collapsible for slowing the arm's movement when the arm is pivoted from the extended position to the retracted position, thereby slowing the rate at which the screen may be retracted.

7. The assembly of claim 6, wherein the reactionator couple includes a force-absorbing member for resisting against the arm's movement when the arm is moved from the extended position to the retracted position.

8. The assembly of claim 6, wherein the reactionator couple includes a pivot which pivotally connects the force-absorbing member to the frame, the pivot providing for controlled pivot of the force-absorbing member about a second pivot axis, spaced from the first pivot axis, when the arm is pivoted between the retracted and extended positions and vice versa.

9. The assembly of claim 8, wherein such controlled pivot of the force-absorbing member is characterized by increasing resistance against arm movement when the arm is pivoted from the extended position to the retracted position, such increased resistance acting to slow the rate at which the screen is retracted.

10. The assembly of claim 9, wherein the force-absorbing member includes a pressure unit which is biased to bear against the pivot so that arm movement is slowed when the arm is pivoted from the extended position to the retracted position.

11. The assembly of claim 10, wherein the force-absorbing member includes a slide member interposed between the pivot and the pressure unit, the slide member being slidable in relation to the arm's movement between the extended and retracted positions, and vice versa, such sliding movement for accommodating, in part, the pressure unit's force-absorbing movement.

12. A retractable projection screen support comprising:

a frame;

a pair of inwardly-foldable, bi-directionally-movable opposed arms, each pivotally mounted on the frame for pivot about a corresponding first pivot axis between a retracted position for stowing the screen, and an extended position for presenting the screen;

at least one glide pivotally connected to the time for pivot about a second pivot axis spaced from the first pivot axis and mounted for reciprocal movement along a glide track mounted on one of the arms; and at least one pressurized retraction decelerator coupled between the glide member and at least one of the opposed arms, the retraction decelerator including a reciprocally-movable stop which abuts the glide member under pressure to yieldably resist movement of the support from the extended position to the retracted position.

13. The support of claim 12, wherein the arms are pivotally mounted on the frame for articulation between the retracted and extended, and wherein the arms are articulable about defined axes which are generally parallel to one another.

14. The support of claim 13, wherein the support includes two pressurized retraction decelerators, each one of which is coupled between the frame and an associated one of the arms.

15. The support of claim 12, wherein the glide member includes a glide arm and a slide coupled thereto, the glide arm being pivotally mounted on the frame, and the slide being movable by the glide arm when the support is moved from the extended position to the retracted position, the stop being configured to abut the slide to resist movement of the support.

16. The support of claim 13, wherein each arm includes an upper portion and a lower portion pivotally connected thereto.

17. In a screen presentation device which includes a frame and a retractable screen mounted on the frame for biased movement between a retracted position and a presented position, an improvement comprising:

an articulable arm pivotally mounted on the frame for moving the screen between the retracted and presented positions, the arm being pivotal about a first axis; and a retraction-controlling element operatively interconnected between the frame and the arm, the retraction controlling element including a pivot mounted on the frame for pivot about a second axis spaced from the first axis, a moveable guide connected to the pivot and mounted for movement along a glide track of the arm, and a shock absorber mounted on the arm and having a pressurized stopper which engages the glide to resist movement of the arm when the arm moves the screen from the extended position to the retracted position.

18. The device of claim 17, wherein the retraction-controlling element increases resistance to movement of the arm as the arm approaches the retracted position so as to progressively slow the screen's retraction.

19. The device of claim 17, wherein the retraction-controlling element includes a shock absorber with a biased stopper arm.

20. The device of claim 19, wherein the retraction-controlling element includes a slide member connected between the frame and the shock absorber and in abutting engagement with the stopper arm.

21. The device of claim 17, wherein the retraction-controlling element is pressurized.

* * * * *